United States Patent
Balachandran et al.

(10) Patent No.: US 9,036,495 B2
(45) Date of Patent: May 19, 2015

(54) METHODS AND DEVICES FOR ADJUSTING RESOURCE MANAGEMENT PROCEDURES BASED ON MACHINE DEVICE CAPABILITY INFORMATION

(71) Applicant: Telefonaktiebolaget L M Ericsson (publ), Stockholm (SE)

(72) Inventors: Kumar Balachandran, Pleasanton, CA (US); Konstantinos Dimou, Stockholm (SE); Chester Park, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 193 days.

(21) Appl. No.: 13/728,360

(22) Filed: Dec. 27, 2012

(65) Prior Publication Data
US 2014/0185465 A1 Jul. 3, 2014

(51) Int. Cl.
| H04L 12/16 | (2006.01) |
| H04J 1/16 | (2006.01) |
| G08C 15/00 | (2006.01) |
| H04W 4/00 | (2009.01) |
| H04W 28/02 | (2009.01) |
| H04W 24/00 | (2009.01) |

(52) U.S. Cl.
CPC .......... *H04W 28/0215* (2013.01); *H04W 4/005* (2013.01); *H04W 24/00* (2013.01)

(58) Field of Classification Search
USPC .......... 370/235–252, 329–332; 455/410–435, 455/458–517; 709/223–236
See application file for complete search history.

(56) References Cited

U.S. PATENT DOCUMENTS

| 6,954,647 | B2* | 10/2005 | Lin et al. ................... 455/455 |
| 8,229,470 | B1* | 7/2012 | Ranjan et al. ............. 455/456.3 |
| 8,654,644 | B2* | 2/2014 | Sundell et al. ............... 370/235 |
| 8,676,211 | B2* | 3/2014 | Jones et al. ................. 455/440 |
| 8,730,910 | B2* | 5/2014 | Qi ............................... 370/331 |
| 8,818,404 | B2* | 8/2014 | Brisebois ................ 455/456.1 |
| 2010/0124934 | A1* | 5/2010 | Mach ..................... 455/456.1 |
| 2012/0117240 | A1* | 5/2012 | Omar ........................ 709/226 |
| 2012/0302240 | A1* | 11/2012 | Tamaki et al. ............. 455/436 |
| 2013/0225169 | A1* | 8/2013 | Farnsworth et al. ....... 455/436 |
| 2014/0057634 | A1* | 2/2014 | Chang et al. ............... 455/437 |
| 2014/0094204 | A1* | 4/2014 | Dimou et al. .............. 455/501 |

* cited by examiner

*Primary Examiner* — Man Phan
(74) *Attorney, Agent, or Firm* — Rothwell, Figg, Ernst & Manbeck, P.C.

(57) ABSTRACT

Devices and methods for adjusting resource management procedures in a User Equipment (UE) machine device communicating with one or more nodes in a communication network. In one embodiment, a method includes determining, during a first time period, the number of handovers, N, for the UE from a serving node to a different node. The method further includes comparing the value, N, to a threshold, wherein if the value, N, is greater than the threshold, mobility pattern information for the UE includes an indication of high mobility, and if the value, N, is less than or equal to the threshold, the mobility pattern information includes an indication of low mobility. The method also includes transmitting machine device capability information, including the indicated mobility pattern information, to be used for determining an adjustment to a resource management procedure for the UE.

40 Claims, 8 Drawing Sheets

METHODS AND DEVICES FOR ADJUSTING RESOURCE MANAGEMENT PROCEDURES BASED ON MACHINE DEVICE CAPABILITY INFORMATION

TECHNICAL FIELD

The present invention relates generally to machine type communications, and more particularly, to methods and devices for adjusting resource management procedures based on machine device capability information.

BACKGROUND

Machine Type Communications (MTC) are expected to contribute heavily to connectivity and traffic within the mobile broadband industry. The Global System for Mobile Communications/Enhanced Data Rates for GSM Evolution (GSM/EDGE) system already serves a rapidly expanding market for MTC. Mobile communications operators have expressed interest in accommodating traffic that serves wireless sensors/devices within modern evolved networks such as those based on Long Term Evolution (LTE). As part of this, it would be incumbent on them to handle MTC traffic served by existing cellular networks such as GSM/EDGE and to provide a transition for such traffic from e.g., General Packet Radio Services/EDGE (GPRS/EDGE) to future versions of cellular systems, such as 3GPP Long Term Evolution Advance (LTE-A, or LTE-Advanced).

Wireless sensor networks have gained increasing interest from academia and industry. Such networks have, however, predominantly been built around short range communication links, such as those based on Bluetooth, and more recently on the Zigbee standard. It is of particular interest to examine whether existing and future cellular systems can be modified to efficiently accommodate the traffic from these wireless sensor devices. This is a challenging task considering that (1) the latest versions of existing cellular systems, 3GPP systems, such as High Speed Packet Access (HSPA), Long Term Evolution (LTE), or LTE-A, or Institute of Electrical and Electronics Engineers (IEEE) systems, such as 802.16 (WiMax), are conceived primarily with the goal of providing service mainly to mobile broadband users and (2) there is a requirement from operators that these wireless devices (sensors) are low cost and have high energy efficiency.

Signaling mechanisms in existing and future 3GPP and IEEE networks have been conceived with the intention of securing a robust connection/session lasting for long periods of time, and involving transmission of large data volumes. In this respect, signaling mechanisms and protocols involving several long messages amounting to hundreds or thousands of kilobytes of data are not considered as particularly significant overhead when compared to the amount of data traffic exchanged within a session.

However, many wireless sensor devices are expected to transmit with very low activity and with long periods of inactivity between transmissions. Also, such devices typically transmit small amounts of information—typically a few hundred octets of data, indicating, e.g., a measurement or presence. Some wireless sensor devices serve as actuating receivers, where a short message from the network of a few hundred octets of data may need to be processed and acted on. The existing signaling mechanisms for establishing and maintaining a connection with such devices are considered as being considerably "heavy" for such device types or application categories, and there is a real concern that the volume of signaling traffic can quickly overwhelm the cellular network. In other words, the signaling overhead is no longer negligible for very small transmissions. In addition, keeping a connection up or reestablishing a connection on wake-up may constitute an undue burden on a device with a targeted battery life that spans years.

In the most common scenario, devices are anticipated to transmit in uplink a single packet containing measurements, warnings, or other types of information to the cellular network. Hence, data transmissions occur mainly in the uplink, while the downlink serves mainly for transmitting feedback and link control information to devices.

In this respect, entire radio network interfaces and radio resource management algorithms require new approaches. However, in order to perform these modifications to radio protocol architectures and to radio resource management, there is a need to have information on the network side regarding some characteristics of machine devices related to their capabilities, including, for example, their mobility pattern, energy supply and traffic pattern.

Merely polling the machine devices to access device characteristics and capabilities may be challenging because such information is not always hard-coded at the device. Also, the devices might change regarding one of these characteristics, i.e. either their mobility pattern or traffic pattern, or even their energy profile. One example is that the environment related to such information (e.g., mobility pattern) varies with time. Another example is that the device is originally designed for general purposes but is then installed in a specific environment (e.g., mobility pattern).

Accordingly, there is a need for a method and device for adjusting resource management procedures based on machine device capability information, including, for example, mobility pattern information.

SUMMARY

Particular embodiments of the present invention are directed to devices and methods for adjusting resource management procedures based on machine device capability information.

According to certain embodiments, a method is provided for adjusting resource management procedures in a machine device communicating with one or more nodes in a communication network. The method includes detecting, during a first time period, one or more handovers for the machine device from a node serving the machine device to a different node. The method further includes determining the number of handover events, N, during the first time period and determining mobility pattern information for the machine device by comparing the value, N, to a first predetermined threshold, wherein if the value, N, is greater than the first predetermined threshold, the mobility pattern information includes an indication of high mobility for the machine device, and if the value, N, is less than or equal to the first predetermined threshold, the mobility pattern information includes an indication of low mobility for the machine device. The method also includes transmitting machine device capability information, including the determined mobility pattern information, to be used for determining an adjustment to a resource management procedure for the machine device.

According to particular embodiments, adjusting the mobility management procedure includes one or more of a time interval between measurements, time interval between reporting, report size, report quantity, number of transmissions, and one or more parameters relating to reporting triggering criteria.

Particular embodiments further provide a machine device operable in a communication network and communicating with one or more nodes. The machine device includes a processor, a memory coupled to the processor, a transceiver coupled to the processor, and an antenna coupled to the transceiver configured to transmit and receive messages. The processor is configured to detect, during a first time period, one or more handovers for the machine device from a node serving the machine device to a different node and to determine the number of handover events, N, during the first time period. The processor is also configured to determine mobility pattern information for the machine device by comparing the value, N, to a first predetermined threshold, wherein, if the value, N, is greater than the first predetermined threshold, the mobility pattern information includes an indication of high mobility for the machine device; and if the value, N, is less than or equal to the first predetermined threshold, the mobility pattern information includes an indication of low mobility for the machine device. The processor is further configured to transmit machine device capability information, including the determined mobility pattern information, to be used for determining an adjustment to a resource management procedure for the machine device.

Certain embodiments provide for a method for adjusting resource management procedures in a machine device operating in a communication network comprising one or more cell coverage areas. The method includes detecting, during a first time period, one or more times that the machine device enters a cell coverage area and exits a cell coverage area, and determining the number of cell coverage area entrances and exits, M, during the first time period. The method also provides for determining mobility pattern information for the machine device by comparing the value, M, to a first predetermined threshold, wherein, if the value, M, is greater than the first predetermined threshold, the mobility pattern information includes an indication of high mobility for the machine device, and if the value, M, is less than or equal to the first predetermined threshold, the mobility pattern information includes an indication of low mobility for the machine device. The method further includes transmitting machine device capability information, including the determined mobility pattern information, to be used for determining an adjustment to a resource management procedure for the machine device.

In certain embodiments, detecting the machine device entering a cell coverage area is based on the relationship of variables Mn+Ofn+Ocn−Hys>Mp+Ofp+Ocp+Off, and detecting the machine device exiting a cell coverage area is based on the relationship of variables Mn+Ofn+Ocn+Hys<Mp+Ofp+Ocp+Off, where Mn is a measurement result of a neighbor cell, not taking into account any offsets; Ofn is a frequency specific offset of a frequency of the neighbor cell; Ocn is a cell specific offset of the neighbor cell and is set to zero if not configured for the neighbor cell; Hys is a hysteresis parameter for the entering or exiting event; Mp is a measurement result of the cell serving the machine device, not taking into account any offsets; Ofp is a frequency specific offset of a frequency of the cell serving the machine device; Ocp is a cell specific offset of the cell serving the machine device and is set to zero if not configured for the serving cell; and Off is an offset parameter for the entering or exiting event.

In some embodiments, a machine device operable in a communication network comprising one or more cell coverage areas is provided. The machine device includes a processor, a memory coupled to the processor, a transceiver coupled to the processor, and an antenna coupled to the transceiver configured to transmit and receive messages. The processor is configured to detect, during a first time period, one or more times that the machine device enters a cell coverage area and exits a cell coverage area and to determine the number of cell coverage area entrances and exits, M, during the first time period. The processor is also configured to determine mobility pattern information for the machine device by comparing the value, M, to a first predetermined threshold, wherein if the value, M, is greater than the first predetermined threshold, the mobility pattern information includes an indication of high mobility for the machine device, and if the value, M, is less than or equal to the first predetermined threshold, the mobility pattern information includes an indication of low mobility for the machine device. The processor is further configured to transmit machine device capability information, including the determined mobility pattern information, to be used for determining an adjustment to a resource management procedure for the machine device.

In particular embodiments, the processor is further configured to increment a first counter when the machine device is detected as entering a cell coverage area, and increment a second counter when the machine device is detected as exiting a cell coverage area.

In some embodiments, detecting the machine device entering and exiting a cell coverage area is determined based on one or more of 3GPP TS 36.331 Event A1 variables, Event A2 variables, Event A4 variables, Event A5 variables, Event A6 variables, Event B1 variables, and Event B2 variables.

According to certain embodiments, a method is provided for adjusting resource management procedures in a machine device communicating with one or more nodes in a communication network. The method includes measuring, at predetermined intervals, link quality information for the machine device, calculating an average of the measured link quality information during a first time period, and calculating a variance, O, of the link quality information for the machine device based on the calculated average of the measured link quality information. The method also includes determining mobility pattern information for the machine device by comparing the value, O, to a first predetermined threshold, wherein, if the value, O, is greater than the first predetermined threshold, the mobility pattern information includes an indication of high mobility for the machine device, and if the value, O, is less than or equal to the first predetermined threshold, the mobility pattern information includes an indication of low mobility for the machine device. The method further includes transmitting machine device capability information, including the determined mobility pattern information, to be used for determining an adjustment to a resource management procedure for the machine device.

According to particular embodiments, the link quality information includes one or more of Reference Signal Received Power (RSRP), Reference Signal Received Quality (RSRQ) and Signal to Interference-Plus-Noise Ratio (SINR).

In certain embodiments, a machine device operable in a communication network and communicating with one or more nodes is provided. The machine device includes a processor; a memory coupled to the processor; a transceiver coupled to the processor; and an antenna coupled to the transceiver configured to transmit and receive messages. The processor is configured to measure, at predetermined intervals, link quality information for the machine device, to calculate an average of the measured link quality information during a first time period and to calculate a variance, O, of the link quality information for the machine device based on the calculated average of the measured link quality information. The processor is also configured to determine mobility pattern information for the machine device by comparing the value, O, to a first predetermined threshold, wherein if the value, O, is greater than the first predetermined threshold, the mobility pattern information includes an indication of high mobility for the machine device, and if the value, O, is less than or equal to the first predetermined threshold, the mobility pattern information includes an indication of low mobility for the machine device. The processor is further configured to transmit machine device capability information, including the determined mobility pattern information, to be used for determining an adjustment to a resource management procedure for the machine device.

In some embodiments, the processor is further configured to detect Doppler frequency shifts of the machine device during a time period and calculate an estimate of the machine device's Doppler frequency shifts, P, based on the detected Doppler frequency shifts. The processor is further configured to determine mobility pattern information for the machine device by comparing the value, P, to a predetermined Doppler frequency shift threshold, wherein if the value, P, is greater than the Doppler frequency shift threshold, the mobility pattern information includes an indication of high mobility for the machine device, and if the value, P, is less than or equal to the Doppler frequency shift threshold, the mobility pattern information includes an indication of low mobility for the machine device.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods and devices for adjusting resource management procedures in a machine device communicating with one or more nodes in a communication network In exemplary embodiments of the disclosed methods and devices, a method for adjusting resource management procedures based on machine device capability information is described. In the methods and devices described herein, resource management procedures in a machine device in communication with a node are adjusted to, for example, determine mobility pattern information for the machine device and minimize unnecessary handovers and communication traffic. Adjustments are made in response to machine device capability information including one or more of a mobility pattern, energy accessibility and transmission pattern. For example, in response to machine device capability information that indicates that the machine device is located at a fixed position, the node may make use of this information to perform light mobility management, which dispenses with handover and cell reselection.

Figure 1:
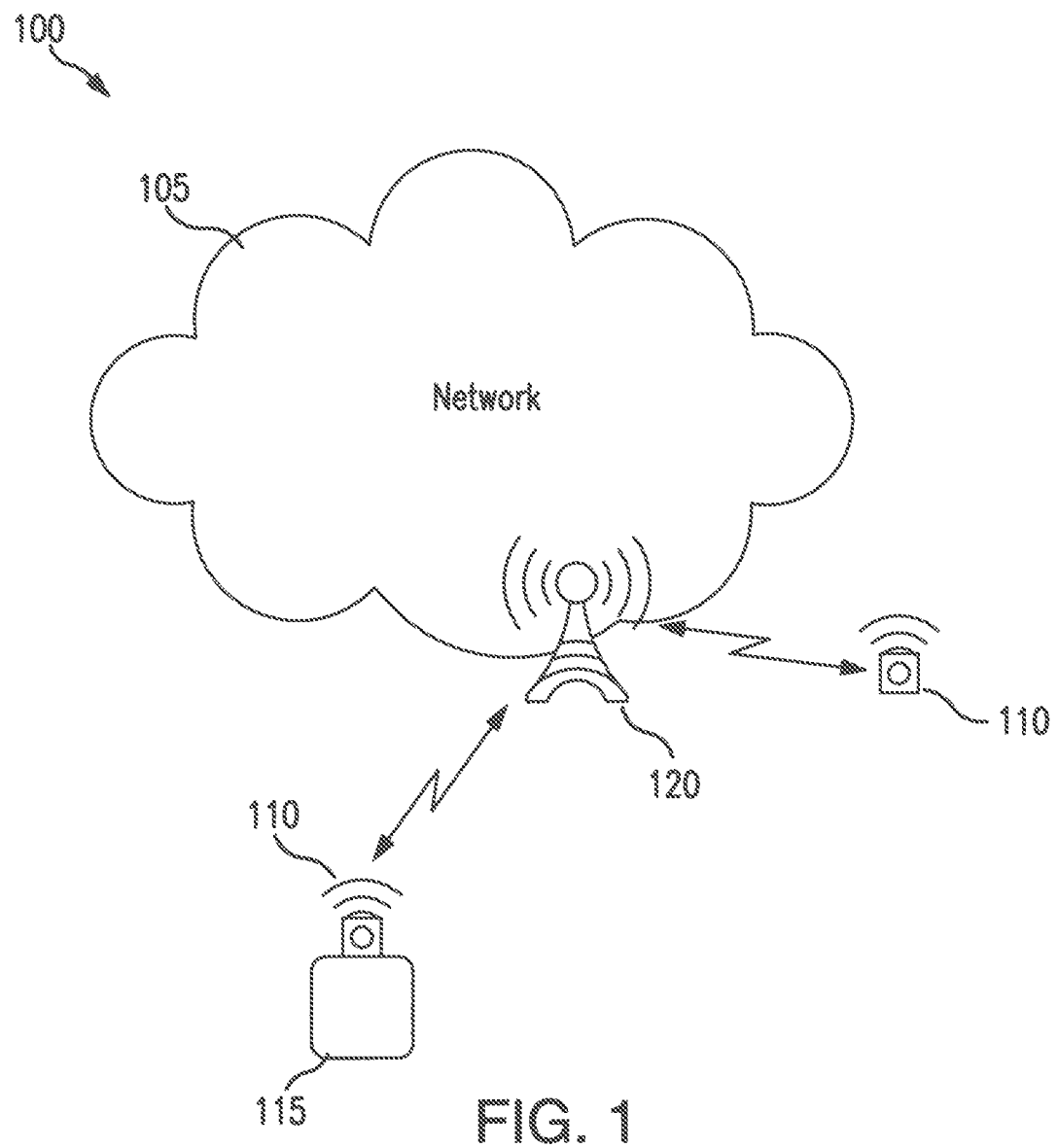
FIG. 1 illustrates an architecture of a wireless communication system with a machine type communication deployment.

Referring now to FIG. 1, an architecture of a wireless communication system 100 with a machine type communication (MTC) deployment, in accordance with exemplary embodiments of the present invention, is illustrated. As shown, wireless communication system 100 includes a wireless network 105, machine devices 110, a fixed location 115, and a node 120. Examples of machine devices 110 include wireless User Equipment (UE) and communication devices, such as, for example, detection instruments for use in agriculture, forestry and other applications with large areas of deployment and relatively low access to power, mobile telephones, personal digital assistants, electronic readers, portable electronic tablets, personal computers, and laptop computers. Examples of node 120 include base stations and relay nodes, such as, for example, serving eNodeB (eNB), high power and macrocell base stations and relay nodes.

Figure 2:
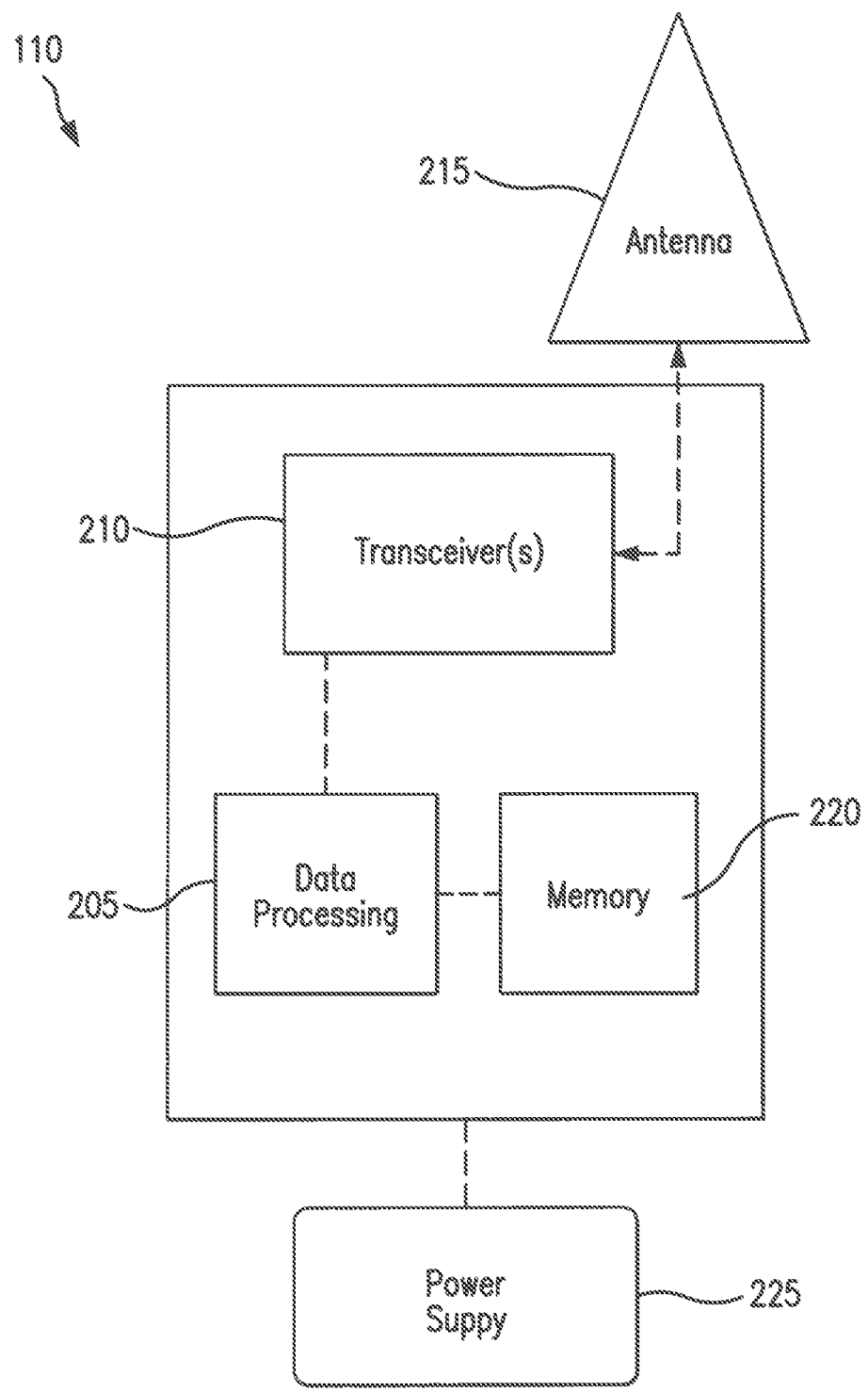
FIG. 2 is a block diagram of a machine device, as used in the system of FIG. 1, in accordance with exemplary embodiments of the present invention.

Referring now to FIG. 2, a block diagram of a machine device 110, as used in the system of FIG. 1 in accordance with exemplary embodiments of the present invention, is illustrated. As shown in FIG. 2, machine device 110 may include: a data processing system 205, which may include one or more microprocessors and/or one or more circuits, such as an application specific integrated circuit (ASIC), field-programmable gate arrays (FPGAs), and the like; a transceiver 210 for transmitting data to (and receiving data from) node 120 via one or more antennas 215; and a memory 220, which may include one or more non-volatile storage devices and/or one or more volatile storage devices (e.g., random access memory (RAM)). In embodiments where data processing system 205 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes machine device 110 to perform steps described below (e.g., steps described below with reference to the flow charts shown in FIGS. 4, 5, 6, 7, and 8). In other embodiments, machine device 110 is configured to perform the steps described herein without the need for code. That is, for example, data processing system 205 may consist merely of one or more ASICs. Hence, the features of the present invention described above may be implemented in hardware and/or software. For example, in particular embodiments, the functional components of the machine device 110 described above may be implemented by data processing system 205 executing computer instructions, by data processing system 205 operating independent of any computer instructions, or by any suitable combination of hardware and/or software. The machine device 110 can receive power from a power supply 225, which can be internal or external to the machine device 110.

Figure 3:
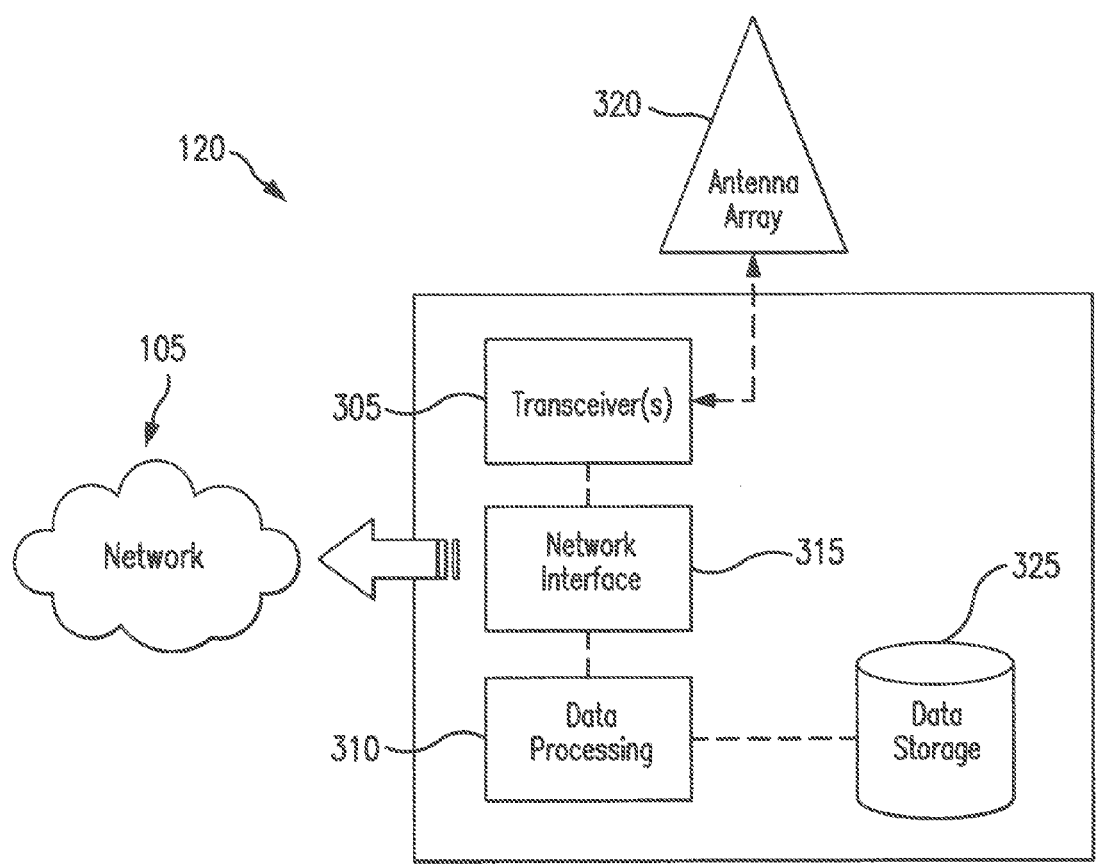
FIG. 3 is a block diagram of a node, as used in the system of FIG. 1, in accordance with exemplary embodiments of the present invention.

Referring now to FIG. 3, a block diagram of node 120, as used in the system of FIG. 1 in accordance with exemplary embodiments of the present invention, is illustrated. As shown in FIG. 3, node 120 may include: a data processing system 310, which may include one or more microprocessors and/or one or more circuits, such as an application specific integrated circuit (ASIC), field-programmable gate arrays (FPGAs), and the like; network interface 315; and a data storage system 325, which may include one or more non-volatile storage devices and/or one or more volatile storage devices (e.g., random access memory (RAM)). The network interface 315 is connected to transceiver 305, which is configured to transmit and receive signals via one or more antennas, such as, for example, an antenna array 320. In embodiments where the data processing system 310 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 310 to perform steps described below performed by nodes. In other embodiments, the node 120 is configured to perform the steps described herein without the need for code. That is, for example, data processing system 310 may consist merely of one or more ASICs. Hence, the features of the present invention described above may be implemented in hardware and/or software. For example, in particular embodiments, the functional components of the node 120 described above may be implemented by data processing system 310 executing computer instructions, by data processing system 310 operating independent of any computer instructions, or by any suitable combination of hardware and/or software.

In one embodiment, a user equipment (UE) machine device 110 sends a radio resource control (RRC) connection request to serving evolved NodeBs (eNB) 120. The RRC connection request, in this exemplary embodiment, includes machine device capability information, which may include one or more of a mobility pattern, energy accessibility status, and transmission pattern. In response to the RRC connection request, the serving eNB 120 may send a RRC connection setup message to the machine device 110. The RRC connection setup message, in this exemplary embodiment, may include a resource management procedure adjustment, which in turn may include one or more of a mobility management procedure adjustment and a radio resource management procedure adjustment.

The mobility pattern may indicate whether the machine device 110 is placed on a fixed location. The transmission pattern may indicate if the machine device 110 is going to transmit according to a specific pattern. This could include, for example, information pertaining to the periodicity of transmissions, average data transmission size, sleep cycle, modulation and coding scheme (MCS) capability, and any other appropriate information relating to a transmission pattern.

The machine device capability information may be available to the manufacturer, owner, user, or those installing the device 110. Thus, such information can be hard-coded into the device 110, set/configured manually by those installing and deploying the device 110, or automatically detected by the device 110. In one embodiment, the machine device information may include a mobility pattern that indicates the device 110 is fixed, and that information may be hard-coded into the device 110. In such a configuration, the device 110 may not be moved once installed, as movement would result in erroneous mobility management (MM) and radio resource management (RRM).

In another embodiment, the machine device capability information may be automatically detected by the machine device 110. The data processing system 205 of machine device 110, in this exemplary embodiment, may determine to transmit the machine device capability information under appropriate conditions, such as when there is a change in the capability information. For example, in one embodiment, a mobility pattern may be obtained from a GPS contained on the machine device 110 and transmitted when the device 110 is moved or in response to a machine device capability information request. In yet another embodiment, the transmission pattern can be calculated by the data processing system 205 based on past transmission records stored in memory 220 and transmitted when the pattern changes or in response to a machine device capability information request.

In some embodiments, the machine device 110 may measure, prior to transmitting machine device capability information to the serving eNB 120, a value relating to a radio channel signal quality for transmitting to the node, and transmit the machine device capability information only when the measured value is above a predefined threshold. For example, the machine device 110 may measure the Reference Signal Received Power (RSRP), Reference Signal Received Quality (RSRQ) and Signal-to-Interference plus Noise Ratio (SINR), and transmit the machine device capability information only when the RSRP/RSRQ/SINR is above a certain threshold. Typical threshold values may be, for example, −85 dBm for RSRP, 15 dB for RSRQ, and 15 dB for SINR, assuming a noise-plus-interference level of −100 dBm.

In an exemplary embodiment, the RRC connection request message-may be in accordance with 3GPP TS 36.331, with information elements added to indicate the machine device capability information, which, as discussed above, may include one or more of a mobility pattern and transmission pattern. For example, a new information element with a Boolean value, one bit information, indicating if the machine device 110 is stationary, may be added as a basic UE mobility pattern. Similar information elements may be added for traffic pattern. These information elements are provided by way of example only, and any number or form of information elements may be added to indicate the machine device capability information.

In response to receiving the machine device capability information, the serving eNB 120 may decide to make resource management procedure adjustments which include one or more of a mobility management procedure and a radio resource management procedure. Mobility management procedure adjustments may include adjustments to the time interval between measurements, time interval between reporting, report size, report quantity, number of transmissions, parameters relating to reporting triggering criteria, and any other relevant procedure related to mobility management.

Report quantity adjustments, for example, may include adjustments to RSRP and RSRQ. Parameter adjustments related to the event triggering the measurement report may be, for example, cell-specific offsets. Radio resource management procedure adjustments may include adjustments to one or more of scheduling, link adaptation, power control, load control, DRX cycle, and any other relevant procedure related to radio resource management.

As described above, the information relating to the mobility pattern may indicate whether the machine device 110 is at a fixed location. In one exemplary embodiment, if the machine device 110 is indeed located at a fixed position (as reported by the mobility pattern), the serving eNB 120 may decide to apply "light" mobility management (MM) for the UE machine device. "Light" MM implies that the machine device 110 does not need to perform frequent MM related measurements that a device would otherwise need to perform if it were mobile. In this case, the machine device 110 would not need to make measurements on reference symbols for purposes of handover or cell reselection. Moreover, the machine device 110 would not need to transmit sounding reference signals (SRS) in UL to the serving eNB 120. Additionally, the serving eNB 120 would not need to page the machine device 110 for subsequent data transmissions. After determining to apply light MM, the eNB 120 transmits the mobility management procedure adjustment to the machine device 110 as part of a resource management procedure adjustment.

Exemplary embodiments provide for a communication network that is equipped with mechanisms and algorithms which can detect device capability information related to the mobility pattern and the traffic pattern of different devices that are available within the network, such as base stations, Radio Network Controllers (RNCs), Mobility Management Entities (MMES), evolved Node Bs (eNBs), Serving Gate-Ways (S-GWs), or Access Points (Aps), that are typically associated with radio resource control. Machine device capability information, once determined by particular embodiments, can be transmitted to these devices as control entity devices. The context of "network" can include the eNB 120 in a network 105 that uses Long Term Evolution (LTE) and can include a heterogeneous network.

Figure 4:
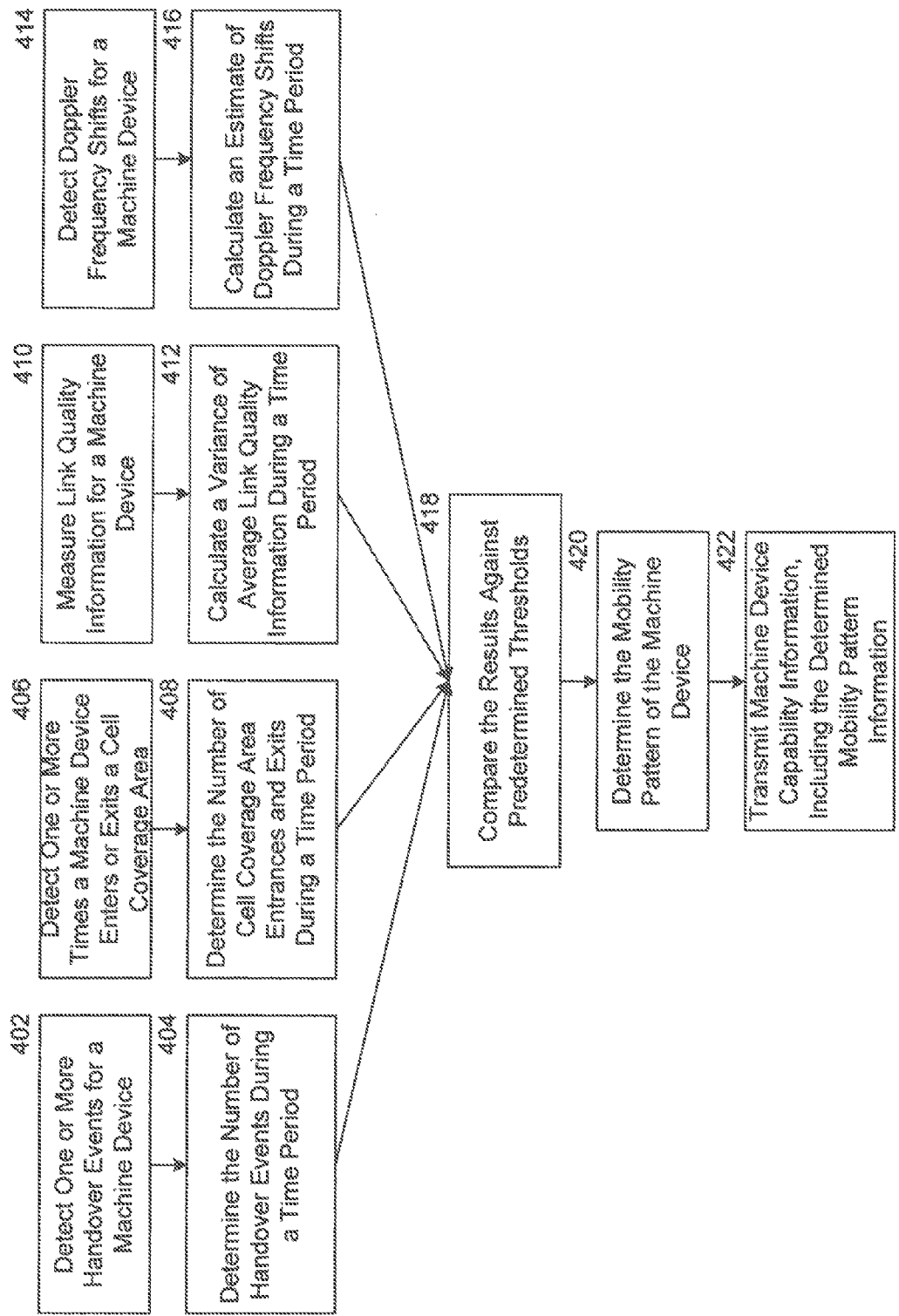
FIG. 4 is a flow chart illustrating the steps performed by a machine device in methods for adjusting resource management procedures based on machine device capability information in accordance with exemplary embodiments of the present invention.
Figure 5:
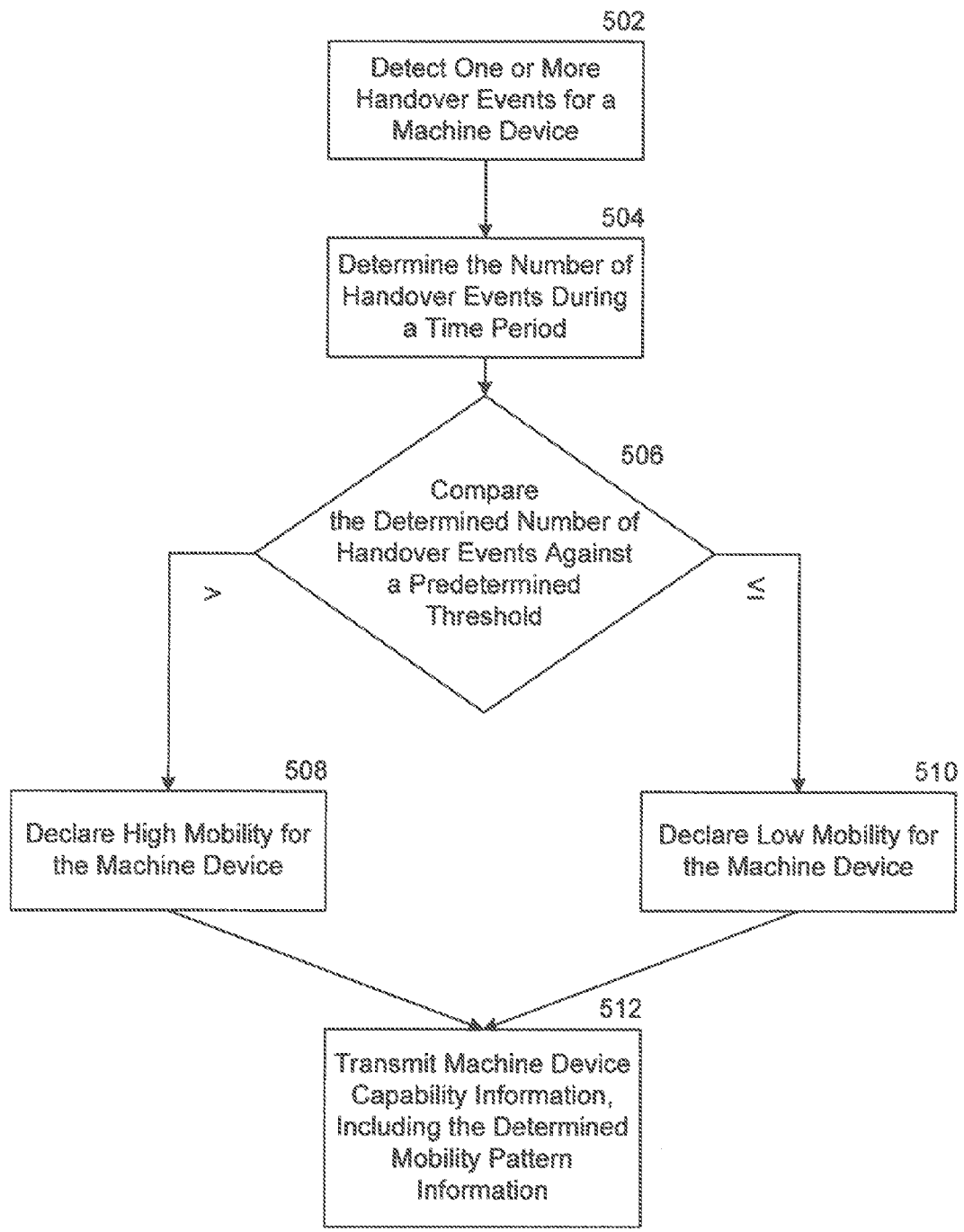
FIG. 5 is a flow chart illustrating the steps performed by a machine device in methods for adjusting resource management procedures based on machine device capability information in accordance with exemplary embodiments of the present invention.

Referring now to FIG. 4, there are shown the steps performed by a machine device 110 for detecting a mobility pattern for the machine device according to the exemplary embodiments.

In particular embodiments, machine devices 110 are equipped with mechanisms, algorithms, and/or protocols which enable them to trace their mobility pattern and/or their traffic pattern. Particular embodiments include several methods for detecting machine device 110 mobility patterns, as shown in FIG. 4. In one embodiment, as shown also in FIG. 5, constancy of connectivity to the same base station 120 can serve as a detection mechanism for low mobility. In this embodiment, each time a machine device 110 is determined as being handed over from one node 120 to another node 120, a handover event is detected at 402 and 502; and the total number of handover events for the machine device during a time period can be determined at 404 and 504. For example, it is possible to characterize the mobility based on the number of handover events, N, within a predefined, or first, time period, T, as expressed in the following comparison at steps 418 and 506:

Declare low mobility at step 510 if N≤Threshold_Handover.

Otherwise, declare high mobility at step 508.

For example, assuming that T is set to 1 second, it is possible to set a first predetermined threshold, or Threshold_Handover to 5. In this case, a handover period of less than 200 ms is considered as high mobility. By increasing the Threshold_Handover up to 10, the threshold handover period is reduced down to 100 ms, and the mobility characteristics become more conservative, i.e., less likely to declare high mobility. If N is determined to be zero at steps 404 and 504, the mobility pattern information for the machine device 110 can include an indication that the device 110 is positioned at a fixed location. Because handover events can be a function of the type of communication network 105 in which the machine device 110 is operating, such as within a heterogeneous network 105, the predetermined Threshold_Handover can be adjusted to accommodate such network-centric variables. After determining the machine device's mobility pattern information based on handover events at steps 420, 508, and 510, machine device capability information for the machine device 110 can then be transmitted at step 422 and 512, such as to a control entity device, including the determined mobility pattern information, to be used for determining an adjustment to a resource management procedure for the machine device 110.

Figure 6:
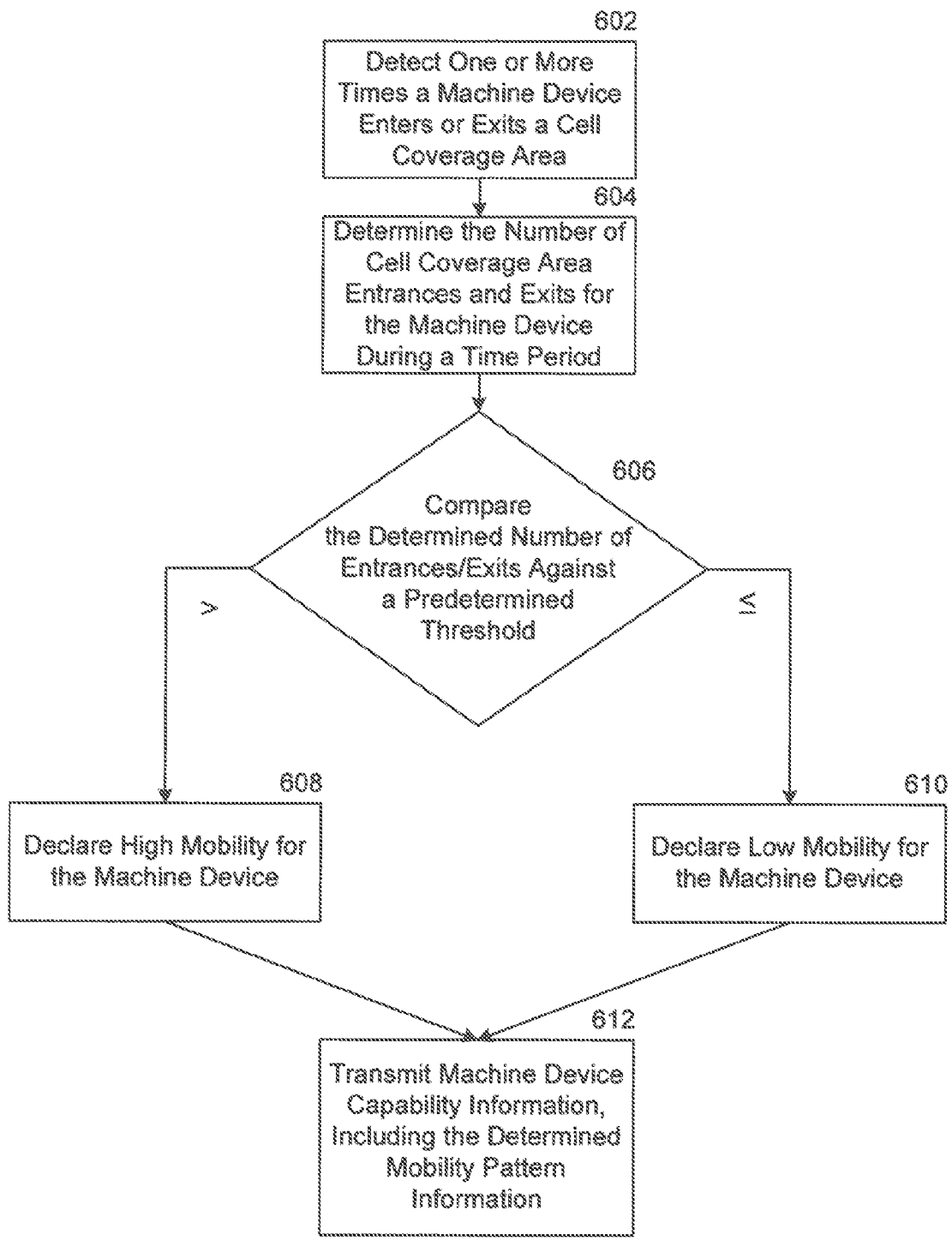
FIG. 6 is a flow chart illustrating the steps performed by a machine device in methods for adjusting resource management procedures based on machine device capability information in accordance with exemplary embodiments of the present invention.

Because the machine device 110 handover decision can be based on Event A3 of 3GPP TS 36.331 in LTE, it is possible to evaluate the following conditions and characterize the mobility pattern of the machine device 110 without counting the handover events, based on the machine device entering or leaving, or exiting, a cell coverage area, as shown in FIG. 6.

In exemplary embodiments, the machine device 110 entering a cell coverage area can be determined by the Inequality Event A3-1 if the A3 variables have the following relationship:

$$Mn+Ofn+Ocn-Hys>Mp+Ofp+Ocp+Off$$

The UE 110 exiting a cell coverage area can be determined by the Inequality Event A3-2 if the A3 variables have the following relationship:

$$Mn+Ofn+Ocn+Hys<Mp+Ofp+Ocp+Off$$

The variables in the above two formulas are defined as follows under 3GPP TS 36.331:

Mn is a measurement result of the neighboring cell, not taking into account any offsets.

Ofn is a frequency specific offset of a frequency of the neighbor cell (i.e. offsetFreq as defined within measObjectEUTRA corresponding to the frequency of the neighbor cell), with a value of 0-5 dB.

Ocn is a cell specific offset of the neighbor cell (i.e. cellIndividualOffset as defined within measObjectEUTRA corresponding to the frequency of the neighbor cell), and is set to zero if not configured for the neighbor cell; otherwise it has a value of 0-5 dB.

Mp is a measurement result of the serving cell, not taking into account any offsets.

Ofp is a frequency specific offset of a serving frequency (i.e. offsetFreq as defined within measObjectEUTRA corresponding to the serving frequency), with a value of 0-5 dB.

Ocp is a cell specific offset of the serving cell (i.e. cellIndividualOffset as defined within measObjectEUTRA corresponding to the serving frequency), and is set to zero if not configured for the serving cell; otherwise it has a value of 0-5 dB. Hys is a hysteresis parameter for this event (i.e. hysteresis as defined within reportConfigEUTRA for this event), with a value of 0-5 dB.

Off is an offset parameter for this event (i.e. a3-Offset as defined within reportConfigEUTRA for this event).

Mn, Mp are expressed in dBm in case of RSRP (such as, for example, −100 dBm), or in dB in case of RSRQ, such as, for example, 5 dB).

Ofn, Ocn, Ofp, Ocp, Hys, Off are expressed in dB.

By adjusting the parameters (e.g., hysteresis parameters), it is possible to differentiate the mobility events from the handover events of the first embodiment above. For example, Hys is typically set to 1 dB. By reducing Hys down to 0 dB, it is possible to make the mobility characterization more sensitive regardless of the hysteresis setting of the network 105. Another way of differentiating the mobility characterization from the handover events is to replace the Event A3 formulation with other Events. One example is Event A4 of 3GPP TS 36.331, where the measurement quantity of a neighboring cell goes above a threshold, as in the following Inequality Event A4-1 condition, indicating that the machine device 110 is entering a cell:

$$Mn+Ofn+Ocn-Hys<\text{Threshold}$$

The machine device 110 leaving a cell can be determined by the Inequality Event A4-2 if the A4 variables have the following relationship:

$$Mn+Ofn+Ocn+Hys<\text{Threshold},$$

where Thresh is the threshold parameter for this event (i.e., A4-Threshold as defined within the reportConfigEUTRA for this event. Additionally, Event A1 variables, Event A2 variables, Event A5 variables, Event A6 variables, Event B1 variables, and Event B2 variables can be utilized for determining the machine device 110 entering and exiting a cell coverage area.

Each time the machine device 110 is detected as entering a cell coverage area at steps 406 and 602, a first counter is incremented; and each time the machine device 110 is detected as leaving, or exiting, a cell coverage area at steps 406 and 602, a second counter is incremented. The number of cell coverage area entrances and exits are determined at steps 408 and 604 by summing the first and second counters for a given, or first, time period, T, to produce a total entrance/exit value of M. The first and second counters can be weighted prior to being summed. The mobility pattern for the machine 110 is determined at steps 420, 608, and 610 by comparing at steps 418 and 606 the number of entrances and exits, M, for the machine device 110 during the time period T against a predetermined entrance/exit threshold. If the value M is greater than the entrance/exit threshold, the mobility pattern is determined at step 608 to be high mobility, and the mobility pattern information for the machine device 110 will include an indication of high mobility. If the value M is less than or equal to the entrance/exit threshold, the mobility pattern is determined at step 610 to be low mobility, and the mobility pattern information for the machine device 110 will include an indication of low mobility. After determining the machine device's 110 mobility pattern information based on cell coverage entrances/exits, machine device capability information for the machine 110 can then be transmitted at steps 422 and 612, such as to a control entity device, including the determined mobility pattern information, to be used for determining an adjustment to a resource management procedure for the machine 110.

Utilizing device entering/exiting cell events to trace the machine device's mobility pattern can be more useful and even more accurate at times when, for example, the machine device's handover decision criteria has been configured to avoid too frequent handovers, regardless of the actual mobility of the machine device 110. It should be noted that both RSRP and RSRQ can be considered as the measurement quantity for the above variables.

Figure 7:
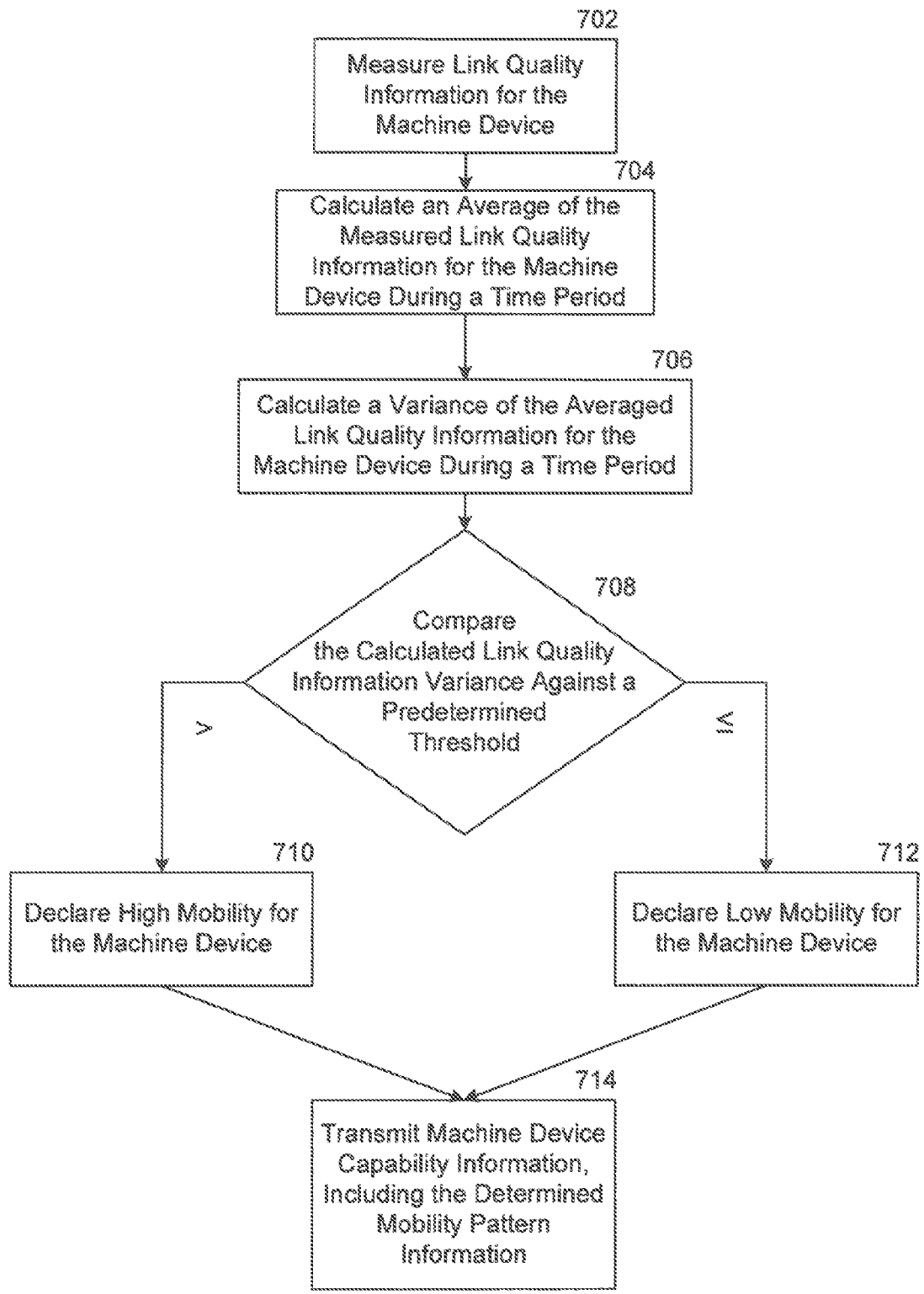
FIG. 7 is a flow chart illustrating the steps performed by a machine device in methods for adjusting resource management procedures based on machine device capability information in accordance with exemplary embodiments of the present invention.

In another embodiment, shown in FIG. 7, a method for identifying low mobility can be based on the low variability of short term averages of the received signal power as is characterized by link quality information for the machine device 110. For example, the machine device 110 can measure at steps 410 and 702, prior to transmitting machine device capability information to the serving eNB 120, a value relating to a radio channel link quality for transmitting signals to the node 120. In this embodiment, the machine device 110 can measure, at steps 410 and 702, the RSRP, RSRQ, and/or SINR values for the machine device 110. The measurement of such link quality information as RSRP variability, for example, can be based on measuring this link quality information for the UE device 110 at predetermined intervals and calculating an average of the measured link quality information at step 704 taken during a measurement, or first time period, T. A variance of the link quality information, O, is then calculated at steps 412 and 706 for the machine device 110 based on the calculated average of the measured link quality information. Mobility pattern information for the machine device 110 can then be determined by comparing at steps 418 and 708 the value, O, to a predetermined link quality variance threshold. If the value, O, is greater than the link quality variance threshold, the mobility pattern information for the machine device 110 is determined at step 710 to be high mobility, and the mobility pattern information for the machine device 110 will include an indication of high mobility. If the value O is less than or equal to the link quality variance threshold, the mobility pattern is determined at step 712 to be low mobility, and the mobility pattern information for the machine device 110 will include an indication of low mobility. After determining the machine device's 110 mobility pattern information based on averaged link quality measurement variances, machine device capability information for the machine 110 can then be transmitted at step 714, such as to a control entity device, including the determined mobility pattern information, to be used for determining an adjustment to a resource management procedure for the machine 110

For example, calculating the truth of:

$$\text{Variance}(RSRP\_\text{average\_over}\_T)<\text{Variance\_Threshold}$$

can be performed at the machine device 110, where Variance_Threshold is the predetermined link quality variance threshold. This comparison can be repeated for both the serving cell 120 and the closest neighbor cells for improved discrimination. Further, the received signal strength and/or the variance in received signal strength can be measured at the node 120. In such a case, in addition to the RSRP, RSRQ, and SINR measurements, the machine device 110 specific reference symbols such as Demodulation Reference Signal (DMRS) or System Requirement Specification (SRS) can be utilized.

Figure 8:
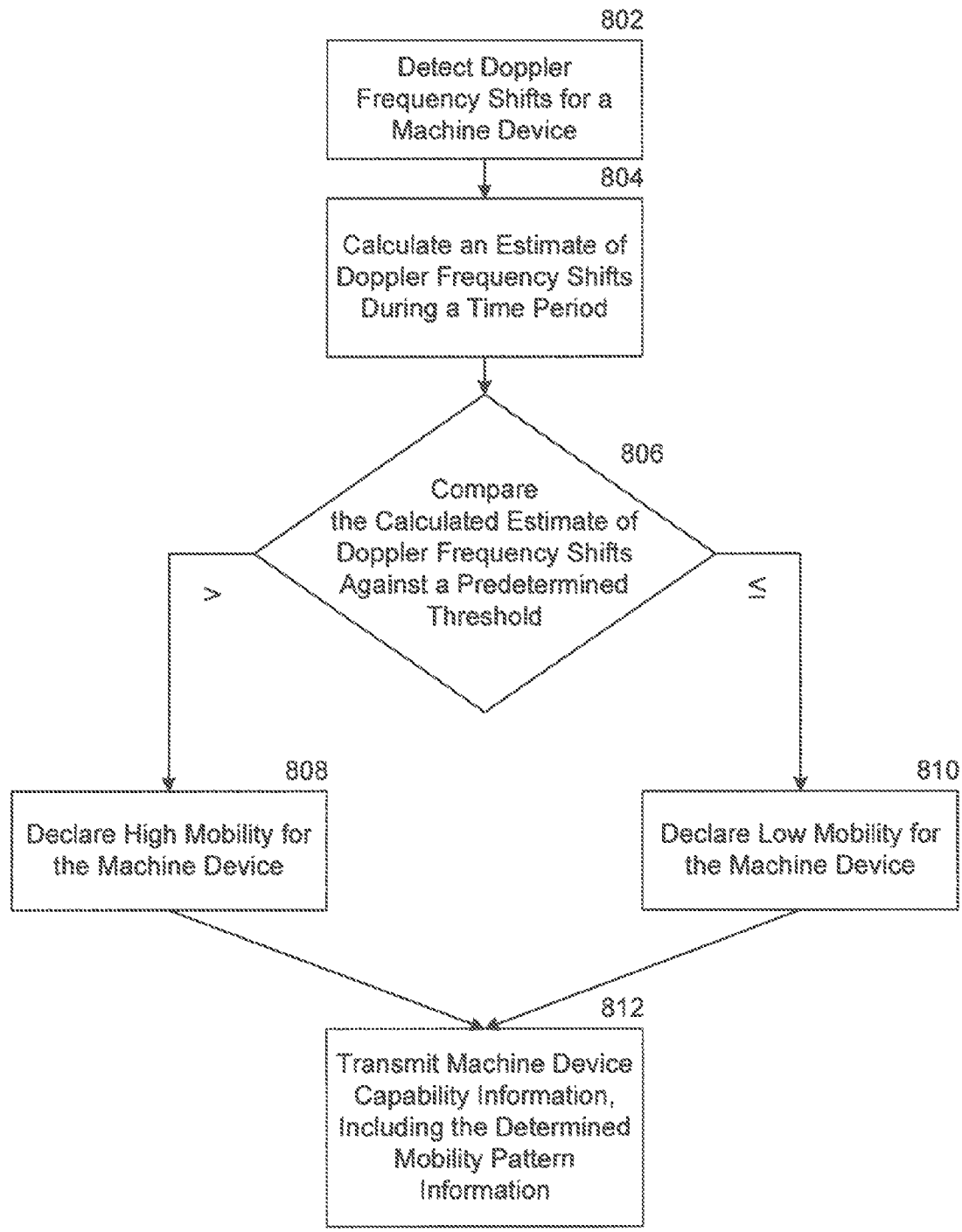
FIG. 8 is a flow chart illustrating the steps performed by a machine device in methods for adjusting resource management procedures based on machine device capability information in accordance with exemplary embodiments of the present invention.

Further enhancement of this variance technique is possible by also considering relative machine device velocity by using Doppler frequency detection during the serving cell and neighbor channel measurements, as shown in FIG. 8. In this embodiment, the machine device 110 signal reception information includes both received signal power values (i.e., link quality information) and Doppler frequency shift values. Alternately, the Doppler frequency shift information alone can be utilized to determine a mobility pattern for the machine device 110. Doppler frequency shift changes differently (i.e., the Doppler frequency shift signature is different) when a machine device 110 is communicating with a node 120, such as a macro base station, as compared with a micro/pico/femto base station. When a machine device 110 is communicating with a node 120, such as a micro/pico/femto base station, where there often is line-of-sight (LOS) propagation, the Doppler frequency shift varies significantly from positive to negative or negative to positive values. In contrast, when a machine device 110 is communicating with a node 120, such as a macro base station, where there often is not LOS propagation, the Doppler frequency shift does not vary significantly from positive to negative or negative to positive values, but follows continuous-like line variations. Therefore, a higher rate of Doppler frequency shifts suggests the machine device 110 having a higher mobility pattern.

One example of detecting Doppler frequency shifts at step 414 and 802 is based on the estimation of correlation between multiple consecutive measurements, since the auto-correlation of measurements is typically related to the Doppler frequency, e.g., given by a function of Doppler frequency and time duration between two consecutive measurements. An estimate, P, of the detected Doppler frequency shifts is calculated at steps 416 and 804 from the Doppler frequency shifts that have been detected during a second time period. This second time period can be the same time period across which the average of the measured link quality information is calculated in step 704 above, or can be a different time period. Mobility pattern information for the machine device 110 can then be determined by comparing at steps 418 and 806 the value, P, to a predetermined Doppler frequency shift estimate threshold. If the value, P, is greater than the link quality variance threshold, the mobility pattern information for the machine device 110 is determined at step 808 to be high mobility, and the mobility pattern information for the machine device 110 will include an indication of high mobility. If the value P is less than or equal to the link quality variance threshold, the mobility pattern is determined at step 810 to be low mobility, and the mobility pattern information for the machine device 110 will include an indication of low mobility. After determining the machine device's 110 mobility pattern information based on averaged link quality measurement variances, machine device capability information for the machine 110 can then be transmitted at step 812, such as to a control entity device, including the determined mobility pattern information, to be used for determining an adjustment to a resource management procedure for the machine 110.

Since multiple measurement samples can be available to the machine device 110 within one measurement period, the sampling can help improve the Doppler frequency shift detection. For higher robustness, these measurements can be repeated more frequently. The features of the embodiments shown in FIGS. 7 and 8 do not increase complexity nor the energy consumption within the machine device 110 significantly because the machine device 110 routinely performs RSRP and other measurements (with well-specified time intervals) by default. Therefore, the addition of the above procedures regarding signal power variances and Doppler frequency shifts add little to ongoing machine device 110 measurements and processing.

For the sake of robustness, the machine device 110 might also check the variance of measurements of Channel Quality Indicator (CQI) or Channel State Information (CSI). However, these measurements include interference levels; and, as such, they are more likely to exhibit higher variance than the measurements exhibited by RSRP, RSRQ, and SINR link quality measurements. For even higher robustness, the machine device 110 can use additional information on mobility obtained by "mobility state" measurements, such as the measurements performed for mobility purposes and as described in 3GPP TS 36.331 for connected mode and in 3GPP TS 36.304 for idle mode. Further, the machine device 110 can also use the information on velocity measured for positioning purposes as described in 3GPP TS 36.331. Once the machine device 110 has detected that the variance in, for example, RSRP is very small and hence the UE device 110 is not moving, then this notification is transmitted to a control unit at the node 120 as discussed above.

A traffic pattern for the machine device 110 can also be readily detected at the machine device 110. If a machine device 110 is found to be transmitting a given number, N, of transport blocks (TBs) of a given size of, K bits, at well-defined time periods, of L seconds, within a longer observation period, of M seconds, this is a strong indication that the machine device 110 is transmitting/reporting the same information within the pre-defined time period. In such a case, the physical, or Medium Access Control (MAC) or Radio Link Control (RLC) layer can send an indication to the control entity for the UE device 110 with the detected transmission pattern. This indication might contain information, such as the number of bits transmitted and the period during which traffic arrives. However, the amount of data transmitted over a time period does not represent the traffic pattern for the machine device 110. For example, when the network is heavily loaded and some machine devices 110 are not scheduled for a long period, the traffic handled by the machine device 110 might be low, while the machine device 110 can actually be experiencing a high traffic pattern. In such a circumstance, the buffer status report may help to trace the traffic pattern for the machine device 110.

In another exemplary embodiment, the node 120 can make use of additional schemes to detect a mobility pattern and/or a traffic pattern for a machine device 110. For example, Global Positioning Systems (GPS), speedometers, and measurements performed to detect a mobility state of the machine device 110 in both a connected mode and an idle mode (as described in 3GPP TS 36.331 and 3GPP TS 36.304) can be utilized, either separately or in combination. In the event the mobility pattern or the traffic pattern for the machine device 110 is determined to have changed, a corresponding update notice can be transmitted to the node 120. In these embodiments, therefore, the node 120 or a user can discern and discriminate between high and low mobility of the machine device 110, periodic or aperiodic traffic patterns of the machine device 110, as well as low duty cycle and high duty cycle access patterns for the machine device 110. Related to the traffic of the machine device 110, embodiments permit detection of whether the machine devices 110 transmit a given amount of data with a given periodicity. Such information can be used for triggering and adjusting resource management procedures for a machine device 110 in a communications network 105.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for adjusting resource management procedures in a machine device communicating with one or more nodes in a communication network, the method comprising:
   detecting, during a first time period, one or more handovers for the machine device from a node serving the machine device to a different node;
   determining the number of handover events, N, during the first time period;
   determining mobility pattern information for the machine device by comparing the value, N, to a first predetermined threshold, wherein:
   if the value, N, is greater than the first predetermined threshold, the mobility pattern information includes an indication of high mobility for the machine device, and
   if the value, N, is less than or equal to the first predetermined threshold, the mobility pattern information includes an indication of low mobility for the machine device; and
   transmitting machine device capability information, including the determined mobility pattern information, to be used for determining an adjustment to a resource management procedure for the machine device, wherein the adjustment to the resource management procedure for the machine device includes adjusting one or more of a mobility management procedure and a radio resource management procedure and the adjustment includes one or more of a time interval between measurements, time interval between reporting, report size, report quantity, number of transmissions, and one or more parameters relating to reporting triggering criteria.

2. The method of claim 1, wherein, if the value, N, is zero, the mobility pattern information includes an indication that the machine device is positioned at a fixed location.

3. The method of claim 1, wherein the machine device capability information is transmitted to a control entity device.

4. The method of claim 3, wherein the control entity device comprises one or more of a base station, a Mobility Management Entity (MME), a Serving GateWay (S-GW), and an access point.

5. The method of claim 1, wherein the value of the first predetermined threshold is adjusted based on whether the communication network is a heterogeneous network.

6. The method of claim 1, wherein adjusting the radio resource management procedure includes one or more of scheduling, link adaptation, power control, load control and DRX cycle.

7. A machine device operable in a communication network and communicating with one or more nodes, comprising:
   a processor;
   a memory coupled to the processor;
   a transceiver coupled to the processor; and
   an antenna coupled to the transceiver configured to transmit and receive messages;
   wherein the processor is configured to:
   detect, during a first time period, one or more handovers for the machine device from a node serving the machine device to a different node;
   determine the number of handover events, N, during the first time period;
   determine mobility pattern information for the machine device by comparing the value, N, to a first predetermined threshold, wherein:
   if the value, N, is greater than the first predetermined threshold, the mobility pattern information includes an indication of high mobility for the machine device, and
   if the value, N, is less than or equal to the first predetermined threshold, the mobility pattern information includes an indication of low mobility for the machine device; and
   transmit machine device capability information, including the determined mobility pattern information, to be used for determining an adjustment to a resource management procedure for the machine device, wherein the adjustment to the resource management procedure for the machine device includes adjusting one or more of a mobility management procedure and a radio resource management procedure and the adjustment includes one or more of a time interval between measurements, time interval between reporting, report size, report quantity, number of transmissions, and one or more parameters relating to reporting triggering criteria.

8. The machine device of claim 7, wherein, if the value, N, is zero, the mobility pattern information includes an indication that the machine device is positioned at a fixed location.

9. The machine device of claim 7, wherein the machine device capability information is transmitted to a control entity device.

10. The machine device of claim 9, wherein the control entity device comprises one or more of a base station, a Mobility Management Entity (MME), a Serving GateWay (S-GW), and an access point.

11. The machine device of claim 7, wherein the value of the first predetermined threshold is adjusted based on whether the communication network is a heterogeneous network.

12. The machine device of claim 7, wherein adjusting the radio resource management procedure includes one or more of scheduling, link adaptation, power control, load control and DRX cycle.

13. A method for adjusting resource management procedures in a machine device operating in a communication network comprising one or more cell coverage areas, the method comprising:
   detecting, during a first time period, one or more times that the machine device enters a cell coverage area and exits a cell coverage area;
   determining the number of cell coverage area entrances and exits, M, during the first time period;
   determining mobility pattern information for the machine device by comparing the value, M, to a first predetermined threshold, wherein:
   if the value, M, is greater than the first predetermined threshold, the mobility pattern information includes an indication of high mobility for the machine device, and
   if the value, M, is less than or equal to the first predetermined threshold, the mobility pattern information includes an indication of low mobility for the machine device; and
   transmitting machine device capability information, including the determined mobility pattern information, to be used for determining an adjustment to a resource management procedure for the machine device, wherein the adjustment to the resource management procedure for the machine device includes adjusting one or more of a mobility management procedure and a radio resource management procedure and the adjustment includes one or more of a time interval between measurements, time interval between reporting, report size, report quantity, number of transmissions, and one or more parameters relating to reporting triggering criteria.

14. The method of claim 13, wherein detecting one or more times that the machine device enters a cell coverage area and exits a cell coverage area includes incrementing a first counter when the machine device is detected as entering a cell coverage area, and incrementing a second counter when the machine device is detected as exiting a cell coverage area.

15. The method of claim 14, wherein the number of cell coverage area entrances and exits, M, is the value of the sum of the first and second counters.

16. The method of claim 15, wherein one or more of the first counter and the second counter are weighted prior to being summed.

17. The method of claim 13, wherein detecting the machine device entering a cell coverage area is based on the relationship of variables $Mn+Ofn+Ocn-Hys>Mp+Ofp+Ocp+Off$, and detecting the machine device exiting a cell coverage area is based on the relationship of variables $Mn+Ofn+Ocn+Hys<Mp+Ofp+Ocp+Off$, where Mn is a measurement result of a neighbor cell, not taking into account any offsets;

Ofn is a frequency specific offset of a frequency of the neighbor cell;

Ocn is a cell specific offset of the neighbor cell and is set to zero if not configured for the neighbor cell;

Hys is a hysteresis parameter for the entering or exiting event;

Mp is a measurement result of the cell serving the machine device, not taking into account any offsets;

Ofp is a frequency specific offset of a frequency of the cell serving the machine device;

Ocp is a cell specific offset of the cell serving the machine device and is set to zero if not configured for the serving cell; and Off is an offset parameter for the entering or exiting event.

18. The method of claim 13, wherein detecting the machine device entering and exiting a cell coverage area is determined based on one or more of Event A1 variables, Event A2 variables, Event A4 variables, Event A5 variables, Event A6 variables, Event B1 variables, and Event B2 variables.

19. The method of claim 13, wherein, if the value, N, is zero, the mobility pattern information includes an indication that the machine device is positioned at a fixed location.

20. The method of claim 13, wherein the machine device capability information is transmitted to a control entity device.

21. The method of claim 20, wherein the control entity device comprises one or more of a base station, a Mobility Management Entity (MME), a Serving GateWay (S-GW), and an access point.

22. The method of claim 13, wherein the value of the first predetermined threshold is adjusted based on whether the communication network is a heterogeneous network.

23. The method of claim 13, wherein adjusting the radio resource management procedure includes one or more of scheduling, link adaptation, power control, load control and DRX cycle.

24. A machine device operable in a communication network comprising one or more cell coverage areas, comprising:

a processor;

a memory coupled to the processor;

a transceiver coupled to the processor; and an antenna coupled to the transceiver configured to transmit and receive messages;

wherein the processor is configured to:

detect, during a first time period, one or more times that the machine device enters a cell coverage area and exits a cell coverage area;

determine the number of cell coverage area entrances and exits, M, during the first time period;

determine mobility pattern information for the machine device by comparing the value, M, to a first predetermined threshold, wherein:

if the value, M, is greater than the first predetermined threshold, the mobility pattern information includes an indication of high mobility for the machine device, and if the value, M, is less than or equal to the first predetermined threshold, the mobility pattern information includes an indication of low mobility for the machine device; and transmit machine device capability information, including the determined mobility pattern information, to be used for determining an adjustment to a resource management procedure for the machine device, wherein the adjustment to the resource management procedure for the machine device includes adjusting one or more of a mobility management procedure and a radio resource management procedure and the adjustment includes one or more of a time interval between measurements, time interval between reporting, report size, report quantity, number of transmissions, and one or more parameters relating to reporting triggering criteria.

25. The machine device of claim 24, wherein the processor is further configured to increment a first counter when the machine device is detected as entering a cell coverage area, and increment a second counter when the machine device is detected as exiting a cell coverage area.

26. The machine device of claim 25, wherein the number of cell coverage area entrances and exits, M, is the value of the sum of the first and second counters.

27. The machine device of claim 26, wherein one or more of the first counter and the second counter are weighted prior to being summed.

28. The machine device of claim 24, wherein detecting the machine device entering a cell coverage area is based on the relationship of variables $Mn+Ofn+Ocn-Hys>Mp+Ofp+Ocp+Off$, and detecting the machine device exiting a cell coverage area is based on the relationship of variables $Mn+Ofn+Ocn+Hys<Mp+Ofp+Ocp+Off$, where Mn is a measurement result of a neighbor cell, not taking into account any offsets;

Ofn is a frequency specific offset of a frequency of the neighbor cell;

Ocn is a cell specific offset of the neighbor cell and is set to zero if not configured for the neighbor cell;

Hys is a hysteresis parameter for the entering or exiting event;

Mp is a measurement result of the cell serving the machine device, not taking into account any offsets;

Ofp is a frequency specific offset of a frequency of the cell serving the machine device;

Ocp is a cell specific offset of the cell serving the machine device and is set to zero if not configured for the serving cell; and Off is an offset parameter for the entering or exiting event.

29. The machine device of claim 24, wherein detecting the machine device entering and exiting a cell coverage area is determined based on one or more of Event A1 variables, Event A2 variables, Event A4 variables, Event A5 variables, Event A6 variables, Event B1 variables, and Event B2 variables.

30. The machine device of claim 24, wherein, if the value, N, is zero, the mobility pattern information includes an indication that the machine device is positioned at a fixed location.

31. The machine device of claim 24, wherein the machine device capability information is transmitted to a control entity device.

32. The machine device of claim 31, wherein the control entity device comprises one or more of a base station, a Mobility Management Entity (MME), a Serving GateWay (S-GW), and an access point.

33. The machine device of claim 24, wherein the value of the first predetermined threshold is adjusted based on whether the communication network is a heterogeneous network.

34. The machine device of claim 24, wherein adjusting the radio resource management procedure includes one or more of scheduling, link adaptation, power control, load control and DRX cycle.

35. A method for adjusting resource management procedures in a machine device communicating with one or more nodes in a communication network, the method comprising:
    measuring, at predetermined intervals, link quality information for the machine device;
    calculating an average of the measured link quality information during a first time period;
    calculating a variance, O, of the link quality information for the machine device based on the calculated average of the measured link quality information;
    determining mobility pattern information for the machine device by comparing the value, O, to a first predetermined threshold, wherein:
    if the value, O, is greater than the first predetermined threshold, the mobility pattern information includes an indication of high mobility for the machine device, and
    if the value, O, is less than or equal to the first predetermined threshold, the mobility pattern information includes an indication of low mobility for the machine device;
    transmitting machine device capability information, including the determined mobility pattern information, to be used for determining an adjustment to a resource management procedure for the machine device.

36. The method of claim 35, wherein the link quality information includes one or more of Reference Signal Received Power (RSRP), Reference Signal Received Quality (RSRQ), and Signal to Interference-Plus-Noise Ratio (SINR).

37. The method of claim 35, further comprising:
    detecting, during a second time period, Doppler frequency shifts of the machine device;
    calculating an estimate, P, of the machine device's Doppler frequency shifts based on the detected Doppler frequency shifts during the second time period; and
    determining mobility pattern information for the machine device by comparing the value, P, to a predetermined Doppler frequency shift threshold, wherein:
    if the value, P, is greater than the Doppler frequency shift threshold, the mobility pattern information includes an indication of high mobility for the machine device, and
    if the value, P, is less than or equal to the Doppler frequency shift threshold, the mobility pattern information includes an indication of low mobility for the machine device.

38. A machine device operable in a communication network and communicating with one or more nodes, comprising:
    a processor;
    a memory coupled to the processor;
    a transceiver coupled to the processor; and
    an antenna coupled to the transceiver configured to transmit and receive messages;
wherein the processor is configured to:
    measure, at predetermined intervals, link quality information for the machine device;
    calculate, during a second time period, an average of the measured link quality information;
    calculate a variance, O, of the link quality information for the machine device based on the calculated average of the measured link quality information during the second time period;
determine mobility pattern information for the machine device by comparing the value, O, to a first predetermined threshold, wherein:
    if the value, O, is greater than the first predetermined threshold, the mobility pattern information includes an indication of high mobility for the machine device, and
    if the value, O, is less than or equal to the first predetermined threshold, the mobility pattern information includes an indication of low mobility for the machine device;
    transmit machine device capability information, including the determined mobility pattern information, to be used for determining an adjustment to a resource management procedure for the machine device.

39. The machine device of claim 38, wherein the link quality information includes one or more of Reference Signal Received Power (RSRP), Reference Signal Received Quality (RSRQ), and Signal to Interference-Plus-Noise Ratio (SINR).

40. The machine device of claim 38, wherein the processor is further configured to:
    detect, during a second time period, Doppler frequency shifts of the machine device;
    calculate an estimate, P, of the machine device's Doppler frequency shifts based on the detected Doppler frequency shifts during the second time period; and
    determine mobility pattern information for the machine device by comparing the value, P, to a predetermined Doppler frequency shift threshold, wherein:
    if the value, P, is greater than the Doppler frequency shift threshold, the mobility pattern information includes an indication of high mobility for the machine device, and
    if the value, P, is less than or equal to the Doppler frequency shift threshold, the mobility pattern information includes an indication of low mobility for the machine device.

\* \* \* \* \*

UNITED STATES PATENT AND TRADEMARK OFFICE
CERTIFICATE OF CORRECTION

| | | |
|---|---|---|
| PATENT NO. | : 9,036,495 B2 | Page 1 of 1 |
| APPLICATION NO. | : 13/728360 | |
| DATED | : May 19, 2015 | |
| INVENTOR(S) | : Balachandran et al. | |

It is certified that error appears in the above-identified patent and that said Letters Patent is hereby corrected as shown below:

Specification

In Column 9, Line 36, delete "(MMES)," and insert -- (MMEs), --, therefor.

Signed and Sealed this
Seventeenth Day of November, 2015

Michelle K. Lee
*Director of the United States Patent and Trademark Office*